United States Patent
Yamamura et al.

(10) Patent No.: US 8,241,163 B2
(45) Date of Patent: Aug. 14, 2012

(54) RIGHT-LEFT DRIVING FORCE CONTROLLER

(75) Inventors: Takuya Yamamura, Okazaki (JP); Yuichi Ushiroda, Okazaki (JP); Kaoru Sawase, Anjo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 475 days.

(21) Appl. No.: 12/502,772

(22) Filed: Jul. 14, 2009

(65) Prior Publication Data

US 2010/0029437 A1 Feb. 4, 2010

(30) Foreign Application Priority Data

Aug. 1, 2008 (JP) ................................ P2008-199436

(51) Int. Cl.
*F16H 48/20* (2006.01)
(52) U.S. Cl. ........................... 475/84; 475/199; 475/203
(58) Field of Classification Search .................... 475/84, 475/199, 203; 477/35
See application file for complete search history.

(56) References Cited

U.S. PATENT DOCUMENTS

| 2006/0142108 A1* | 6/2006 | Bowen ........................... 475/203 |
| 2008/0135322 A1* | 6/2008 | Smith et al. .................... 180/338 |
| 2008/0296081 A1 | 12/2008 | Yamamura et al. |
| 2008/0300101 A1* | 12/2008 | Jarzyna et al. ................... 477/35 |
| 2009/0082152 A1* | 3/2009 | Ikushima ........................... 475/5 |
| 2010/0161190 A1* | 6/2010 | McCann et al. ................. 701/69 |

FOREIGN PATENT DOCUMENTS

JP 2008-298191 A 12/2008

* cited by examiner

*Primary Examiner* — Ha D. Ho
(74) *Attorney, Agent, or Firm* — Birch, Stewart, Kolasch & Birch, LLP

(57) ABSTRACT

A controller includes: a adjuster, configured to adjust distribution of driving force between right and left wheels; a limiter, configured to limit a difference between operations of the right and left wheels; a first calculator, configured to calculate a first control amount corresponding to the adjustor and including an amount related to direction of shift of driving force between the right and left wheels; a second calculator, configured to calculate a second control amount corresponding to the limiter; a third calculator, configured to calculate a third control amount including the second control amount and the amount; a fourth calculator, configured to calculate a fourth control amount that is a combination of the first and third control amounts; a selector, configured to select either the adjustor and the limiter; and a controller, configured to control the adjustor or the limiter in accordance with the fourth control amount.

2 Claims, 5 Drawing Sheets

US 8,241,163 B2

RIGHT-LEFT DRIVING FORCE CONTROLLER

BACKGROUND OF THE INVENTION

1. Field of the Invention

The present invention relates to a right-left driving force controller and, more particularly, to a technique for controlling right and left driving forces that maintain stable vehicle behavior.

2. Description of the Related Art

There has already been developed a right-left driving force distributor that controls yawing moment acting on a vehicle by producing a difference in driving force of a left wheel and driving force of a right wheel during turning of the vehicle, thereby enhancing turning performance of the vehicle.

However, the right-left driving force distributor of the related-art produces a difference between the right and left wheels in terms of driving force and confronts a problem of being incapable of preventing occurrence of slippages in the right and left wheels during straight ahead driving of the vehicle, and the like.

JP-A-2008-298191 describes a right-left driving force distributor having right-left driving force adjustment means and differential limitation means.

As described in connection with JP-A-2008-298191, the right-left driving force distributor having the right-left driving force adjustment means equipped with the differential limitation means requires control operation for selecting a proper one from the right-left driving force adjustment means and the differential limitation means depending on a situation.

A generally-conceived control technique is to compute, from a driving state of the vehicle, a right-left driving force adjustment level generated by the right-left driving force adjustment means and a differential limit level generated by the differential limitation means, thereby separately controlling the respective means.

However, such a technique has a potential of the right-left driving force adjustment means and the differential limitation means being simultaneously used. If the right-left driving force adjustment means and the differential limitation means are simultaneously used, torque interference will be induced by interlocking action, which raises a problem of deterioration of operating efficiency or controllability of the right-left driving force distributor.

In order to prevent such simultaneous use of the means, a technique for performing selective switching to solely one of the right-left driving force adjustment means and the differential limitation means is also conceivable. However, an abrupt change may arise in the driving force difference because of a difference between the right-left driving force adjustment level and the differential limit level at the time of switching between the right-left driving force adjustment means and the differential limitation means, which in turn makes the behavior of the vehicle discontiguous.

SUMMARY OF THE INVENTION

According to an aspect of the invention, there is provided a controller, configured to control right and left driving forces, the controller including: an adjuster, configured to adjust distribution of driving force between right and left wheels of a vehicle; a limiter, configured to limit a difference between operations of the right and left wheels by adjusting differential limit force to be exerted on the right and left wheels; a first calculator, configured to calculate a first control amount corresponding to a control amount of the adjustor and including an amount related to direction of shift of driving force between the right and left wheels from a driving state of the vehicle; a second calculator, configured to calculate a second control amount corresponding to a control amount of the limiter from the driving state of the vehicle; a third calculator, configured to detect the direction of shift of driving force between the right and left wheels in a case that the limiter is performed, and configured to calculate a third control amount including the second control amount and the amount of the direction of shift of driving force; a fourth calculator, configured to calculate a fourth control amount that is a combination of the first control amount and the third control amount; a selector, configured to select either the adjustor and the limiter according to a predetermined condition; and a control unit, configured to control the adjustor or the limiter selected by the selector in accordance with the fourth control amount.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

An embodiment of the present invention is hereinbelow described by reference to the drawings.

Figure 1:
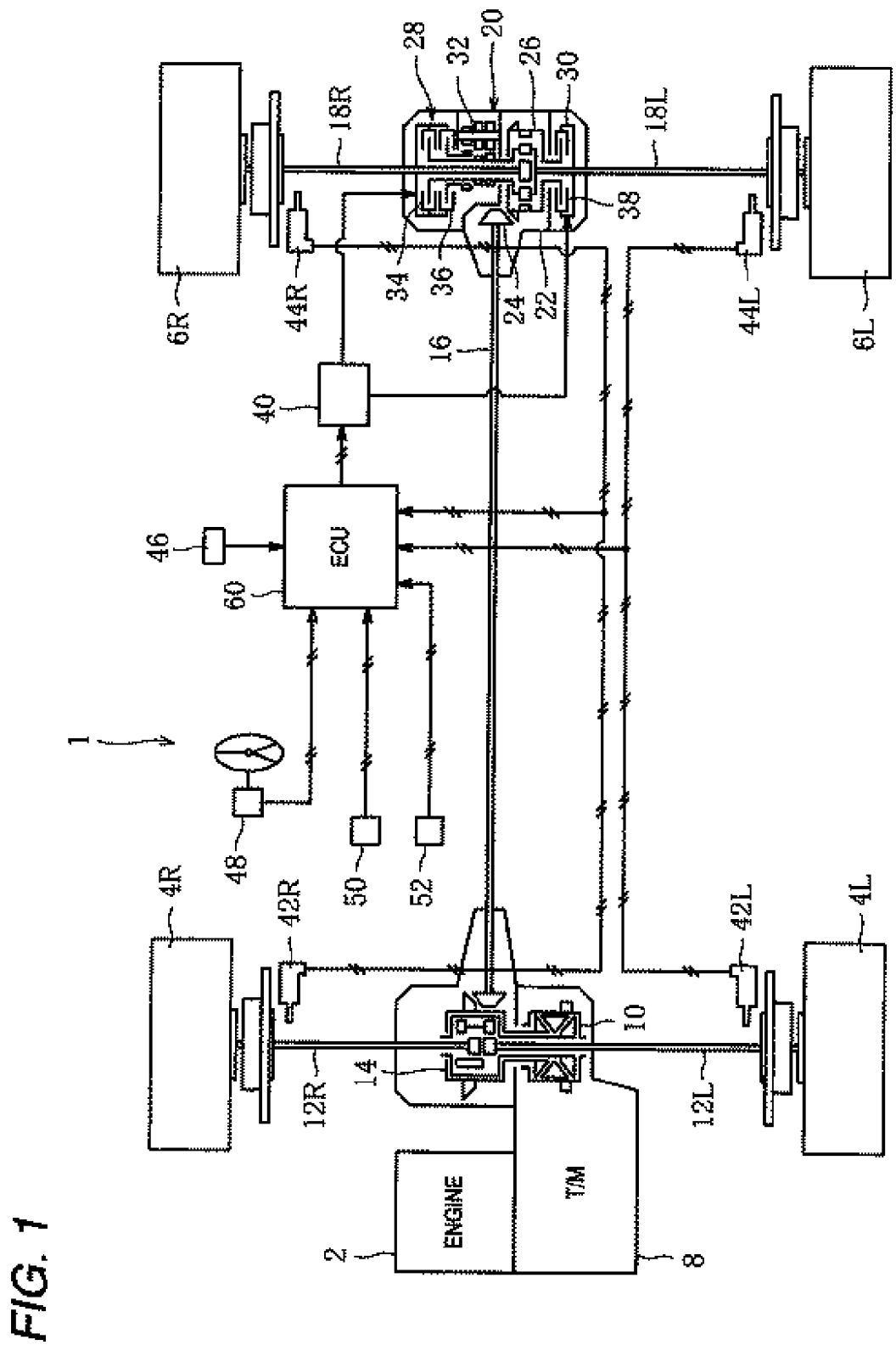
FIG. 1 is a general schematic view of a right-left driving force controller of the present invention.
Figure 2:
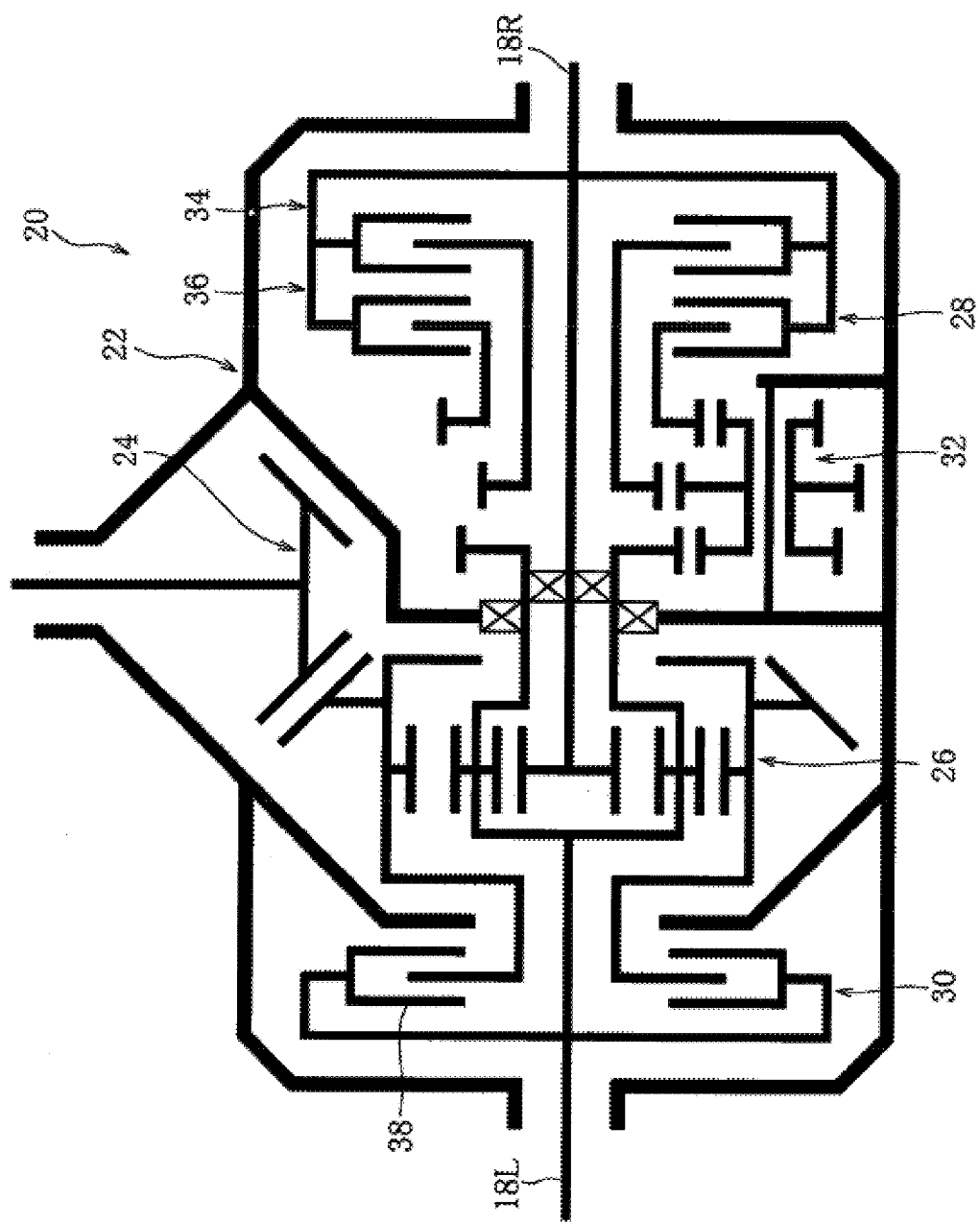
FIG. 2 is an enlarged view of a characteristic section showing a right-left driving force distributor.
Figure 3:
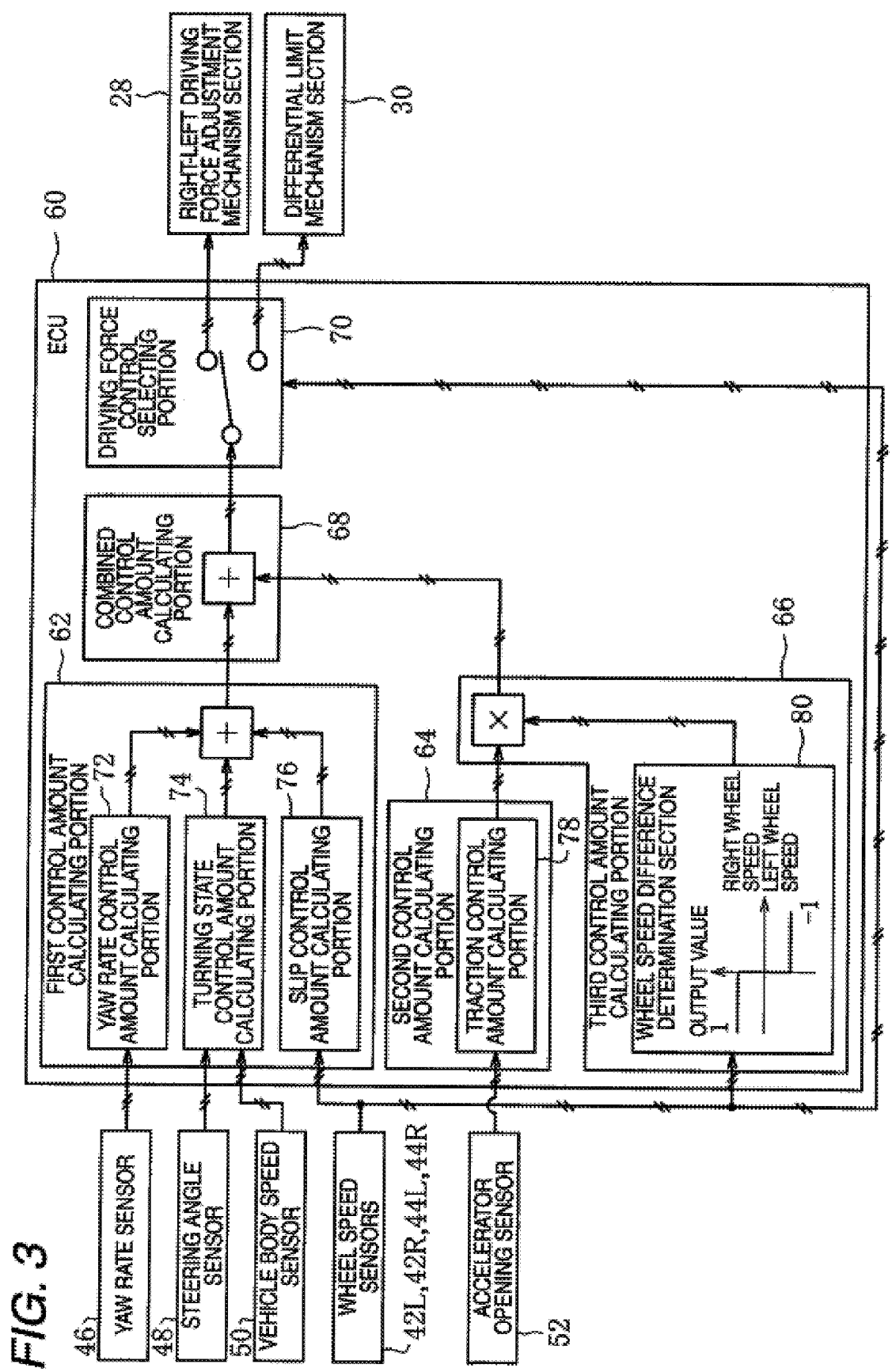
FIG. 3 is a block diagram showing inputs and outputs of an ECU.
Figure 4:
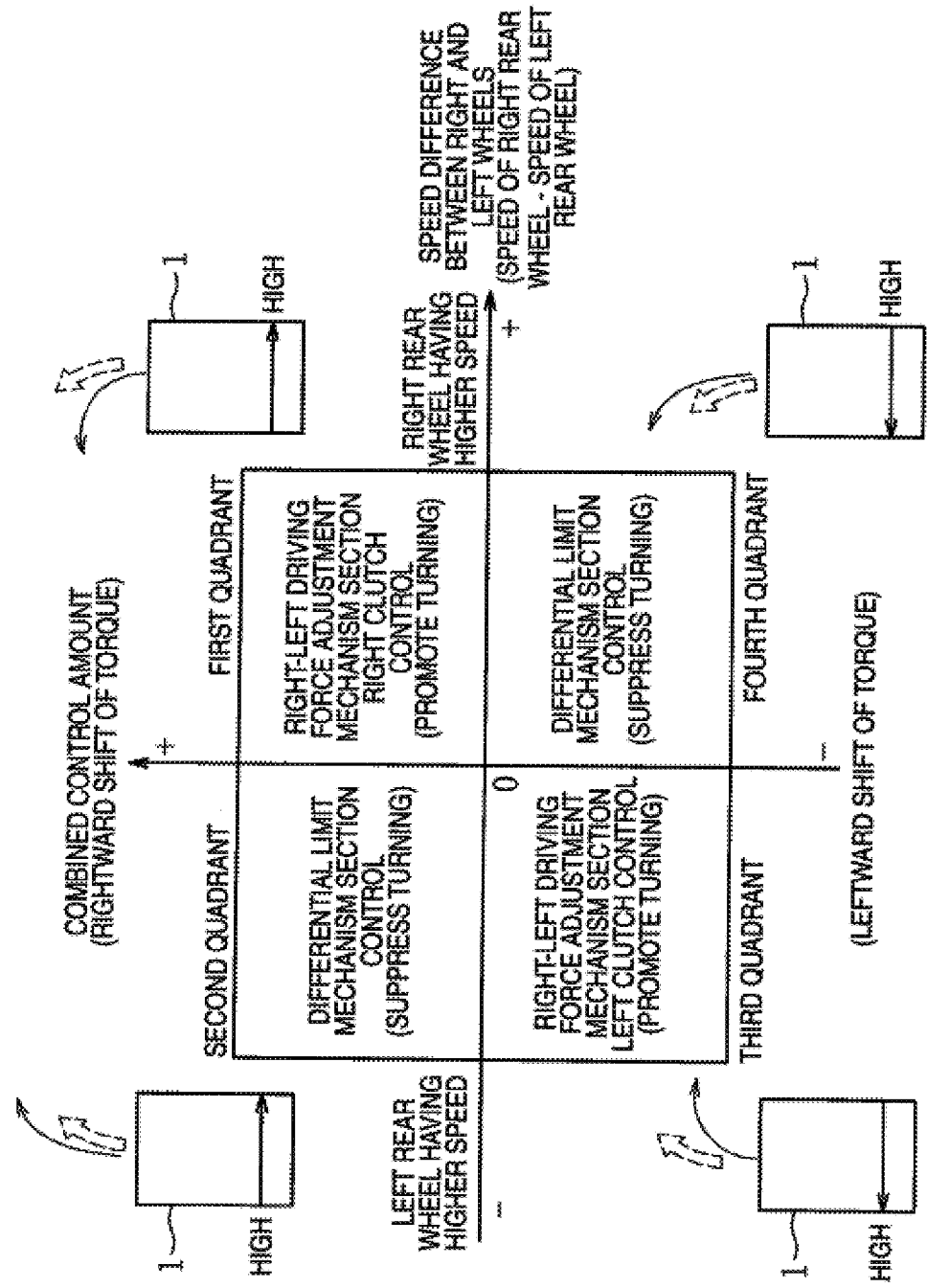
FIG. 4 is a map showing driving force control selection performed in accordance with a driving force shift direction and a wheel speed difference.

By reference to FIGS. 1 through 4, FIG. 1 shows a general schematic view of a right-left driving force controller of the present invention; FIG. 2 shows an enlarged view of a characteristic section showing a right-left driving force distributor; FIG. 3 shows a block diagram showing inputs and outputs of an ECU; and FIG. 4 shows a map showing driving force control selection performed in accordance with a driving force shift direction and a wheel speed difference.

A vehicle 1 shown in FIG. 1 is a four-wheel drive vehicle that has an engine 2 mounted in a front portion of a vehicle body and, as drive wheels, a left front wheel 4L, a right front wheel 4R (both of which are also called in combination front wheels 4), a left rear wheel 6L, and a right rear wheel 6R (both of which are also called in combination rear wheels 6).

More specifically, the vehicle 1 has the engine 2 that is mounted in the front portion of the vehicle body and that serves as a drive source; a transmission 8 linked to one side of the engine 2; a center differential gear 10 that is linked to the transmission 8 and that distributes driving force to the front wheels 4 and the rear wheels 6; a front differential gear 14 that distributes the driving force, which has been distributed to the front wheels 4 by the center differential gear 10, further to a front wheel rotary shaft 12L of the left front wheel 4L and a front wheel rotary shaft 12R of the right front wheel 4R; a propeller shaft 16 that transmits the driving force distributed by the center differential gear 10 to the rear wheels 6; and a right-left driving force distributor 20 that is linked to one end of the propeller shaft 16 and that distributes driving force to a rear wheel rotary shaft 18L of the left rear wheel 6L and a rear wheel rotary shaft 18R of the right rear wheel 6R in accordance with a driving condition of the vehicle 1.

The engine 2, the transmission 8, the center differential gear 10, and the front differential gear 14 are known, and the right-left driving force distributor 20 will be hereinafter described in detail.

As shown in FIG. 2, the right-left driving force distributor 20 houses, in a main unit case 22, an input section 24 working as one end of the propeller shaft 16; a differential mechanism section 26 that is connected to the input section 24 and that is laid on the left rear wheel rotary shaft 18L and the right rear wheel rotary shaft 18R; a right-left driving force adjustment mechanism section 28 (an adjuster) laid on the right rear wheel rotary shaft 18R; and a differential limit mechanism section 30 (a limiter) laid on the left rear wheel rotary shaft 18L.

The right-left driving force distributor 20 enables the differential mechanism section 26 to transmit the driving force input from the proper shaft 16 to the right and left rear wheel rotary shafts 18R and 18L while allowing a difference between rotation of the right rear wheel 6R and rotation of the left rear wheel 6L, and has the function of causing the right-left driving force adjustment mechanism section 28 to shift the driving force of only one of the right and left rear wheels 6R and 6L to the other driving force, thereby distributing the driving force of the right and left rear wheels 6R and 6L. The right-left driving force adjustment mechanism section 28 has a speed increasing/decreasing mechanism 32 that increases or decreases the speed of one rear wheel of the right and left rear wheels 6R and 6L with respect to the remaining rear wheel; a right clutch 34 that shifts the driving force to the right rear wheel 6R with reference to the left rear wheel 6L by engagement with the mechanism; and a left clutch 36 that shifts the driving force to the left rear wheel 6L with reference to the right rear wheel 6R by engagement with the mechanism.

The differential limit mechanism section 30 of the right-left driving force distributor 20 is equipped with a so-called differential limitation clutch 38 built from a multiple disc friction clutch. The differential limit mechanism section 30 has a function of limiting differential operations of the right and left rear wheels 6R and 6L by engagement with the differential limitation clutch 38. Specifically, when a difference has occurred between the speed of the right rear wheel 6R and the speed of the left rear wheel 6L, driving force is shifted from the rear wheel having larger wheel speed to the rear wheel having smaller wheel speed, so long as the differential limitation clutch 38 is engaged with the differential limit mechanism section.

The differential limitation clutch 38 of the differential limit mechanism section 30 and the right clutch 34 and the left clutch 36 of the right-left driving force adjustment mechanism section 28 are actuated by hydraulic pressure from a hydraulic unit 40 mounted on the vehicle 1.

The respective wheels 4L, 4R, 6L, and 6R of the vehicle 1 are equipped with vehicle speed sensors 42L, 42R, 44L, and 44R (a detector) for detecting wheel speeds.

The vehicle 1 has various sensor, such as a yaw rate sensor 46 for detecting a yaw rate of the vehicle 1; a steering wheel sensor 48 for detecting a steering angle; a vehicle body speed sensor 50 for detecting the speed of a vehicle body; and an accelerator opening level sensor 52 for detecting the degree of opening of an accelerator.

The sensors are electrically connected to an ECU (Electronic Control Unit) 60 (a control unit) accommodated in the vehicle 1.

The ECU 60 controls various devices in accordance with sensor information detected by various sensors.

For instance, the ECU 60 has a function of controlling, by way of a hydraulic unit 40, the right-left driving force adjustment mechanism section 28 and the differential limit mechanism section 30 in the right-left driving force distributor 20.

More specifically, as shown in FIG. 3, a first control amount calculating portion 62 (a first calculator), a second control amount calculating portion 64 (a second calculator), a third control amount calculating portion 66 (a third calculator), a combined control amount calculating portion 68 (a fourth calculator), and a driving force control selecting portion 70 (a selector) are created in the ECU 60.

The first control amount calculating section 62 has a yaw rate control amount calculating portion 72 for calculating from a detection result from the yaw rate sensor 46 a yaw rate control amount commensurate with a difference between a target yaw rate and an actual yaw rate; a turning state control amount calculating portion 74 that calculates from detection results from the steering angle sensor 48 and the vehicle body speed sensor 50 a turning state control amount commensurate with a steering angle and a vehicle body speed; and a slip control amount calculating portion 76 that calculates from detection results from the rear wheel speed sensors 44L and 44R a slip control amount commensurate with a wheel slip ratio.

The first control amount calculating portion 62 has a function of calculating a first control amount that is a combination of control amounts computed by the yaw rate control amount calculating portion 72, the turning state control amount calculating portion 74, and the slip control amount calculating portion 76. The first control amount is a control amount for controlling the right-left driving force adjustment mechanism section 28; in other words, an engagement control amount of the right clutch 34 or the left clutch 36. Therefore, the first control amount includes the shift directions of right and left driving forces in the rear wheels 6. For instance, a shift of driving force to the right rear wheel 6R resultant from engagement of the right clutch 34 is represented by a positive value, whereas a shift of driving force to the left rear wheel 6L resultant from engagement of the left clutch 36 is represented by a negative value.

The second control amount calculating portion 64 has a traction control amount calculating portion 78 that calculates from a detection result from the accelerator opening level sensor 52 a traction control amount commensurate with the degree of opening of an accelerator. The second control amount calculating portion 64 has a function of calculating from a traction control amount a second control amount for controlling the differential limit mechanism section 30. The second control amount is an engagement control amount of the differential limitation clutch 38.

The third control amount calculating portion 66 has a wheel speed difference determination portion 80 that determines which one of the right and left rear wheels 6 has faster wheel speed from a difference between the speed of the right wheel and the speed of the left wheel that is determined from detection results of the rear wheel speed sensors 44L and 44R. When a value determined by subtracting the speed of the left rear wheel 6L from the speed of the right rear wheel 6R is positive, the wheel speed difference determination portion 80 outputs a value of −1. When the value is negative, the wheel speed difference determination portion outputs a value of 1. Specifically, when the speed of the right rear wheel 6R is greater, an output value comes to −1. When the speed of the left rear wheel 6L is greater, the output value comes to 1.

The third control amount calculating portion 66 has a function of calculating a third control amount by multiplying the value output from the wheel speed difference determination portion 80 by the second control amount calculated by the second control amount calculating portion 64. Namely, the third control amount is a control amount equivalent to the second control amount that includes the driving force shift direction achieved at the time of engagement of the differential limitation clutch 38. Therefore, as in the case of the driving force shift direction acquired by the first control amount calculating portion 62, the shift of driving force to the right rear wheel 6R is represented by a positive value, and the shift of driving force to the left rear wheel 6L is represented by a negative value as a result of the third control value being multiplied by a value output from the wheel speed difference determination portion 80.

The combined control amount calculating portion 68 has a function of summing the first control amount calculated by the first control amount calculating portion 62 and the third control amount calculated by the third control amount calculating portion 66, to thus calculate a combined control amount. Since the first control amount and the third control amount are control amounts, each of which includes the driving force shift direction, a resultant combined control amount also becomes a control amount including the driving force shift direction.

The driving force control selecting portion 70 also has a function of selecting whether to carry out right-left driving force adjustment control to be performed by the right-left driving force adjustment mechanism section 28 or differential limitation control to be performed by the differential limit mechanism section 30, on the basis of a relationship between the driving force shift direction of the combined control amount computed by the combined control amount calculating portion 68 and a difference between the speeds of the right and left wheels determined from detection results from the rear wheel speed sensors 44L and 44R.

For instance, the driving force selecting portion 70 is assumed to select right-left driving force adjustment control operation to be performed by the right-left driving force adjustment mechanism section 28 when the driving force shift direction included in the combined control amount represents a shift to a wheel having higher speed and to select differential limitation control operation to be performed by the differential limit mechanism section 30 when the driving force shift direction included in the combined control amount represents a shift to a wheel having lower speed.

As shown in FIG. 4, in a map having along its vertical axis a combined control amount for which shifting of driving force to the right rear wheel 6R is taken as positive and also having along its horizontal axis a right left wheel speed difference for which a case where the wheel speed of the right rear wheel 6R is high is taken as positive, right-left driving force adjustment control is assumed to be performed in a driving state belonging to the first quadrant and the third quadrant, and differential limit is assumed to be controlled in a driving state belonging to the second quadrant and the fourth quadrant.

More specifically, the first and third quadrants in the map shown in FIG. 4 represent a case where the driving force is shifted toward an outer wheel with respect to the turning direction of the vehicle 1, to thus cause the driving force to act in a turn-promoting direction. In the first quadrant, the right clutch 34 of the right-left driving force adjustment mechanism section 28 is brought into engagement in accordance with a resultant control amount. In the third quadrant, the left clutch 36 is brought into engagement in accordance with the resultant control amount.

Meanwhile, the second quadrant and the fourth quadrant in the map shown in FIG. 4 show a case where driving force is shifted toward the inner wheels with respect to the turning direction of the vehicle 1, to thus cause driving force to act in a turn-suppressing direction. In the second quadrant and the fourth quadrant, the differential limitation clutch 38 of the differential limit mechanism section 30 is brought into engagement in accordance with a combined control amount. When substantially-straight forward driving involving a small difference in wheel speeds is performed in the second and fourth quadrants, driving force is caused to act in a direction in which straight forward driving is maintained.

Operation of the thus-configured right-left driving force controller of the present invention will be described hereinbelow.

Figure 5:
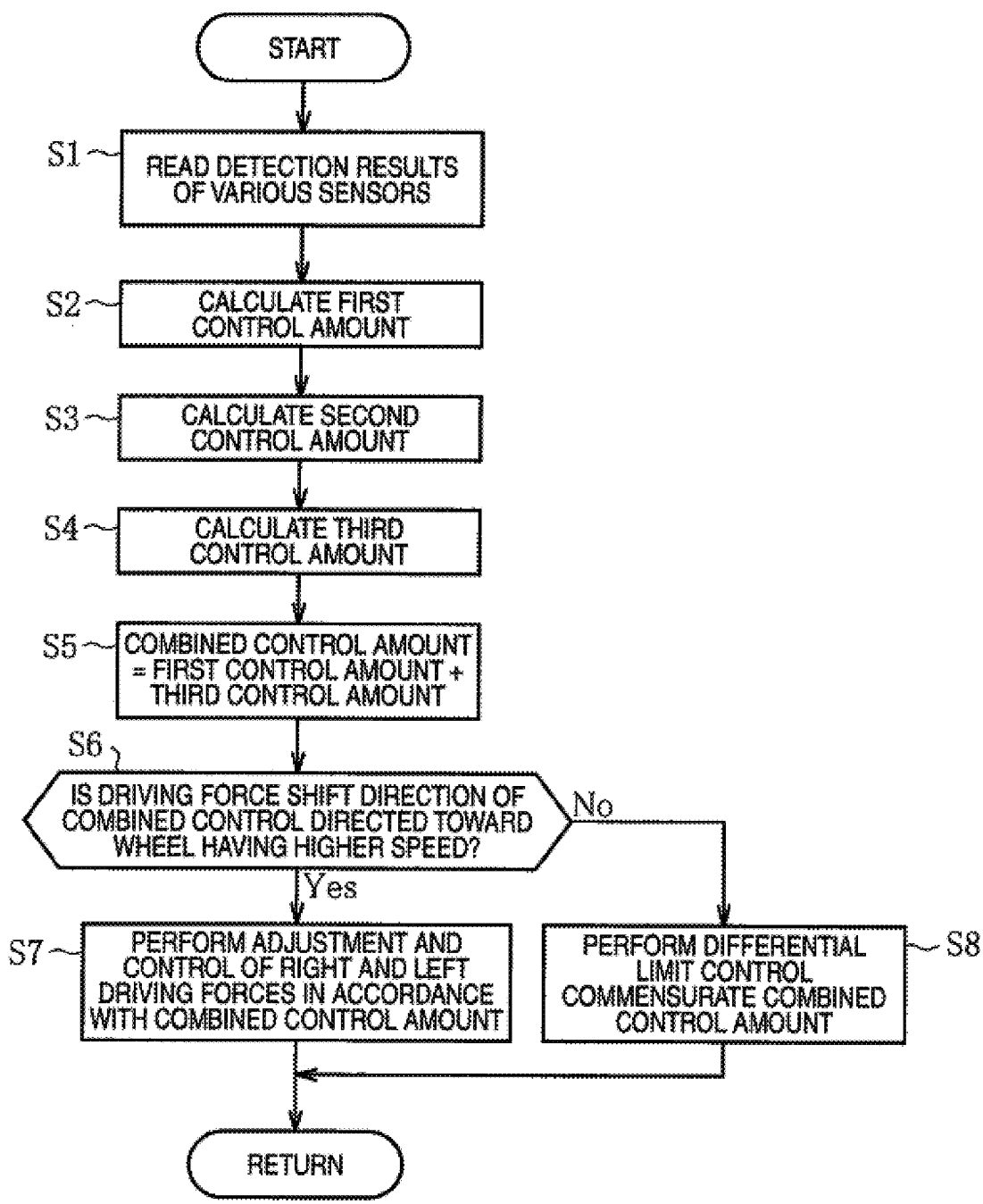
FIG. 5 is a flowchart showing a right-left driving force control routine executed by the right-left driving force controller of the present invention.

By reference to FIG. 5, the right-left driving force control routine executed by the right-left driving force controller of the present invention is provided, and descriptions are hereinbelow provided along the flowchart.

First, in step S1, the ECU 60 reads detection results of various sensors, such as the yaw rate sensor 46, the steering angle sensor 48, the vehicle body speed sensor 50, the wheel speed sensors 42L, 42R, 44L, and 44R, and the accelerator opening level sensor 52.

In step S2, the first control amount calculating portion 62 calculates a first control amount.

In step S3, the second control amount calculating portion 64 calculates a second control amount.

In step S4, the third control amount calculating portion 66 multiplies a value output from the wheel speed difference determination portion 80 by the second control amount calculated in step S3, thereby calculating a third control amount.

In step S5, the combined control amount calculating portion 68 sums the first control amount calculated in step S2 and the third control amount calculated in step S4, to thus calculate a combined control amount.

In step S6, a determination is made as to whether or not the driving force shift direction included in the combined control amount calculated in step S5 is identical with a direction toward a wheel having higher speed among the rear wheels 6. In short, a determination is made as to whether or not a traveling state achieved at this time falls in the first quadrant or the third quadrant of the map shown in FIG. 4.

When a determination result is true (Yes), processing proceeds to step S7.

In step S7, the right clutch 34 or the left clutch 36 of the right-left driving force adjustment mechanism section 28 is subjected to engagement control in accordance with the combined control amount calculated in step S5, and the routine returns.

Meanwhile, when the determination result achieved in step S6 is false (No); namely, when the driving force shift direction of a combined control amount is identical with a direction to a wheel having lower speed among the rear wheels 6 and when a current state matches the driving state of the second quadrant or the driving state of the fourth quadrant in the map of FIG. 4, processing proceeds to step S8.

In step S8, the differential limitation clutch 38 of the differential limit mechanism section 30 is subjected to engagement control in accordance with the combined control amount calculated in step S5, and the routine returns.

As mentioned above, the right-left driving force controller of the present invention has the right-left driving force adjustment mechanism section 28 and the differential limit mechanism section 30 that are provided in the right-left driving force distributor 20. The first control amount corresponding to the control amount of the right-left driving force adjustment mechanism section 28 and the third control amount determined by causing the second control amount commensurate with the control amount of the differential limit mechanism section 30 to include the driving force shift direction are calculated.

As mentioned above, the second control amount that usually does not include the driving force shift direction is converted into the third control amount including the driving force shift direction, thereby enabling combination of the third control amount with the first control amount. By means of a single combined control amount made by combination of the third control amount with the first control amount, the selected right-left driving force adjustment mechanism section 28 or the differential limit mechanism section 30 is controlled.

Simultaneous use of the right-left driving force adjustment mechanism section 28 and the differential limit mechanism section 30 can thereby be prevented.

The selected right-left driving force adjustment mechanism section 28 or differential limit mechanism section 30 is controlled by means of a single combined control amount that is a combination of the third control amount with the first control amount, whereby simultaneous use of the right-left driving force adjustment mechanism section 28 and the differential limit mechanism section 30 can be prevented.

The right-left driving force adjustment mechanism section 28 and the differential limit mechanism section 30 are controlled by means of a single combined control amount, whereby an abrupt change does not occur in driving force difference at the time of switching between the right-left driving force adjustment mechanism section 28 and the differential limit mechanism section 30, so that occurrence of discontinuous behavior of the vehicle can be prevented.

Accordingly, in relation to selection of the right-left driving force adjustment mechanism section 28 or the differential limit mechanism section 30, the right-left driving force adjustment mechanism section 28 is selected when driving force is exerted in the turn-promoting direction from the viewpoint of a relationship between the driving force shift direction included in the combined control amount and the difference between the speed of the right wheel and the speed of the left wheel; and the differential limit mechanism section 30 is selected when driving force is exerted in the straightforward stable direction or the turn-suppressing direction. As a result, the vehicle 1 can smoothly be turned by selecting the right-left driving force adjustment mechanism section 28 at the time of promotion of turning. By selecting the differential limit mechanism section 30 at the time of straightforward driving or suppression of turning, it is possible to assure traction at the time of straightforward driving; to suppress occurrence of slippage of inner wheels, or the like, during turning action; and to assure stable vehicle behavior.

From the above, it is possible to appropriately select a proper one from the right-left driving force adjustment mechanism section 28 and the differential limit mechanism section 30 according to the driving state of the vehicle 1 while stable vehicle behavior is maintained.

Although descriptions about the embodiment of the right-left driving force controller of the present invention are completed, the embodiment is not limited to that mentioned above.

For instance, in the embodiment, the vehicle 1 is a four wheel drive vehicle, but the present invention can also be applied to a two wheel drive vehicle.

In the embodiment, in the right-left driving force distributor 20, the right-left driving force adjustment mechanism section 28 is disposed on the right side of the differential mechanism section 26, and the differential limit mechanism section 30 is disposed on the left side of the same. However, the right-left driving force distributor is not limited to such a configuration. The essential requirement for the right-left driving force controller of the present invention is to be configured so as to include right-left driving force adjustment means and differential limit means.

In the embodiment, the first control amount is calculated from detection results from the yaw rate sensor 46, the steering angle sensor 48, the vehicle body speed sensor 50, and the wheel speed sensors 42L, 42R, 44L, and 44R; and the second control amount is calculated from a detection result from the accelerator opening level sensor 52. However, the essential requirement for the first control amount is to be a control amount compatible with the right-left driving force adjustment mechanism section 28, and the essential requirement for the second control amount is to be a control amount compatible with the differential limit mechanism section 30. The control amounts are not limited to those described in connection with the configuration of the embodiment.

The present embodiment is not limited to the case where the third control amount and the first control amount are directly summed, to thus calculate a combined control amount. For instance, at least one or both of the third and first control amounts can be multiplied by a coefficient, and resultants are summed, to thus calculate a combined control amount, in order to change weighting of the third control amount and the first control amount.

What is claimed is:

1. A controller, configured to control right and left driving forces, the controller comprising:
   an adjustor, configured to adjust distribution of driving force between right and left wheels of a vehicle;
   a limiter, configured to limit a difference between operations of the right and left wheels by adjusting differential limit force to be exerted on the right and left wheels;
   a first calculator, configured to calculate a first control amount corresponding to a control amount of the adjustor and including an amount related to direction of shift of driving force between the right and left wheels from a driving state of the vehicle;
   a second calculator, configured to calculate a second control amount corresponding to a control amount of the limiter from the driving state of the vehicle;
   a third calculator, configured to detect the direction of shift of driving force between the right and left wheels in a case that the limiter is performed, and configured to calculate a third control amount including the second control amount and the amount of the direction of shift of driving force;
   a fourth calculator, configured to calculate a combined control amount that is a combination of the first control amount and the third control amount;
   a selector, configured to select either the adjustor and the limiter according to a predetermined condition; and
   a control unit, configured to control the adjustor or the limiter selected by the selector in accordance with the combined control amount.

2. The controller according to claim 1, further comprising:
   a detector, configured to detect a speed difference between the right wheel and the left wheel, wherein
   in a case that a relationship between the direction of shift of driving force between the right and left wheels included in the combined control amount and the speed difference between the right and left wheels detected by the detector is taken as the predetermined condition, the selector selects the adjustor when the direction of shift of driving force is directed to a wheel having higher speed of the right and left wheels and selects the limiter when the direction of shift of driving force is directed to a wheel having lower speed of the right and left wheels.

* * * * *